United States Patent
Cook et al.

(10) Patent No.: US 7,057,498 B1
(45) Date of Patent: Jun. 6, 2006

(54) APPARATUS FOR VEHICLE/TRAILER HITCH GUIDANCE DEVICE

(76) Inventors: Robert A. Cook, 3713 Dow Dr., Oklahoma City, OK (US) 73116; Roy A. Blasius, 2830 NE. 48th Ave., Norman, OK (US) 73026

( * ) Notice: Subject to any disclaimer, the term of this patent is extended or adjusted under 35 U.S.C. 154(b) by 0 days.

(21) Appl. No.: 10/910,526

(22) Filed: Aug. 3, 2004

Related U.S. Application Data (60) Provisional application No. 60/536,208, filed on Jan. 13, 2004.

(51) Int. Cl.
*G08B 21/00* (2006.01)

(52) U.S. Cl. .......................................... 340/431; 33/264

(58) Field of Classification Search ................ 340/431, 340/901; 280/477; 33/264
See application file for complete search history.

(56) References Cited

U.S. PATENT DOCUMENTS

| | | | |
|---|---|---|---|
| 4,938,495 A | 7/1990 | Beasley et al. | |
| 5,108,123 A | 4/1992 | Rubenzik | |
| 5,191,328 A | 3/1993 | Nelson | |
| 5,650,764 A | 7/1997 | McCullough | |
| 5,861,814 A | 1/1999 | Clayton | |
| 6,100,795 A | 8/2000 | Otterbacher et al. | |
| 6,222,457 B1 | 4/2001 | Mills et al. | |
| 6,259,357 B1 * | 7/2001 | Heider | 340/431 |
| 6,480,104 B1 | 11/2002 | Wall et al. | |
| 6,701,234 B1 * | 3/2004 | Vogelsang | 701/35 |

OTHER PUBLICATIONS

Hitch Guide No Author Mentioned. Archived Magazine article from Jul. 3, 1998. Web Site inactive and E-Mail address no longer valid. Uses basic mechanical sensing.

* cited by examiner

*Primary Examiner*—Jeffery Hofsass
*Assistant Examiner*—Jennifer Mehmood (57) ABSTRACT

A visual aid for assisting a driver backing a towing vehicle to a towed vehicle. The visual/audible display consists of a ten-segment bar graph, with various colors, an indicator lamp and a beeper. A sensor is placed on the ball hitch of the towing vehicle and an emitter is placed on the hitch of the towed vehicle. The sensor receives a signal from the emitter and processes it to be sent to the display. The display indicates the relative positions of the two vehicles. It also provides visual and audible signals to indicate approach of the devices and the proper alignment for hitching. Attachment is temporary and universal, enabling use with any hitch configuration. Data transmission is wireless eliminating the need for cables between the units. All units have enclosed batteries so no external power connection is required.

11 Claims, 7 Drawing Sheets

APPARATUS FOR VEHICLE/TRAILER HITCH GUIDANCE DEVICE

CROSS-REFERENCE TO RELATED APPLICATIONS

This application claims the benefit of Provisional Patent Application Ser. No. 60/536,208, filed Jan. 13, 2004, by the present inventors.

FEDERALLY SPONSORED RESEARCH

Not Applicable.

SEQUENCE LISTING OR PROGRAM

Source code for microprocessors included.

BACKGROUND OF THE INVENTION

Field of Invention

This invention relates to a vehicle/trailer guidance device. More specifically, the invention relates to a device to enable a single person to accurately back a vehicle into position to engage the ball and mount on a trailer hitch.

BACKGROUND OF THE INVENTION

This invention relates generally to a guiding or positioning apparatus for use during hitching a pickup truck or other towing vehicle to a trailer or other towed vehicle. More particularly, this invention relates to a positioning apparatus for aligning the coupling elements of the two vehicles as the towing vehicle is backed up or driven toward the towed vehicle and for indicating when the coupling elements are positioned to be coupled.

Hitching a vehicle to a trailer can be a long and frustrating process, especially when attempted by a single person. Because the coupling elements (i.e., ball and hitch) on the vehicle and trailer are normally not visible from the driver's seat, the driver must periodically stop the vehicle and inspect the alignment and position of the ball and hitch before moving the vehicle closer to the trailer. Even with frequent visual inspections, some misalignment of the ball and hitch normally result. A driver must then repeat the process or, if possible, manually shift the tongue and thus the hitch of the trailer over the ball so that the two vehicles can be coupled. Complicating the maneuvering is the fact that a driver can become easily confused as to which direction to turn the front wheels in order to back the vehicle in the desired direction. Many previously proposed devices require the driver to be able to see a flag or light attached to the trailer, permanently mount and wire a device to the vehicle, or have poor lateral precision and no warning when the vehicle is about to contact the hitch of the trailer, which frequently leads to damage of the towing vehicle.

Many proposed devices use switches or magnets to indicate alignment. For instance, U.S. Pat. No. 5,108,123 to Rubenzik, indicates a magnet placed on the surface below the hitch. Those familiar with the art will realize that the operating range of magnetic switches is limited. This approach limits the vehicle to being in a precise position before an indication is available.

Other proposed devices utilize ultra-sonic means, such as U.S. Pat. No. 5,191,328 to Nelson, to provide distance information. Due to the short transit time of the sonic wave at distances of less than twelve inches, and lack of a well-defined target, the accuracy of these devices is poor.

Devices that require permanent mounting to either vehicle, such as U.S. Pat. No. 6,100,795 to Otterbacher, are subject to damage while the vehicle is used for other purposes.

Additionally some devices, when permanently mounted, may obscure the license plate of the vehicle or provide a safety hazard to persons walking behind the vehicle such as U.S. Pat. No. 4,938,495 to Beasley.

Devices that require internal wiring are difficult to install and the wiring is subject to damage during normal vehicle use. Dangling cords, such as cigarette lighter plugs, can be a distraction for the driver as well as a safety hazard.

Some other proposed devices use a display limited to a single indicator of lateral position error. This does not inform the driver of the amount of error or needed correction. This is little better than visual mechanical means.

BACKGROUND OF THE INVENTION—OBJECTS AND ADVANTAGES

The proposed device provides advantages and improvements over previous inventions as follows:

(a) To provide a display of the lateral position of the hitch in relation to the ball.
(b) To provide a one-inch lateral position precision.
(c) To provide a display of lateral position from a distance greater than six feet.
(d) To provide a warning when the vehicle approaches the hitch.
(e) To provide both visual and audible warnings.
(f) To provide an indication of the hitch being directly over the ball.
(g) To require no permanent mounting or wiring.
(h) To provide a display unit which is small, portable, and wireless.
(i) To provide a display which may be carried outside to facilitate setup of the units.
(j) To provide a device which is easily attached and detached from both vehicle and trailer.
(k) To provide a device which requires no external power.
(l) To provide a device which is small, lightweight, and economical to produce.
(m) To provide a device that is simple to install and use.
(n) To provide a device that will attach to any size ball or style of hitch.
(o) To provide a device that will indicate if an object such as a person is between the vehicle and trailer.

SUMMARY

An object of the invention therefore is to provide a means for a single person to easily, accurately and safely back a vehicle into position to hitch to a trailer, using easily attachable devices, without damage to either vehicle or trailer and provide precise information of the relative position of both.

DETAILED DESCRIPTION—FIG. 1A–7—PREFERRED EMBODIMENT

A preferred embodiment of the individual elements of the present invention is illustrated in FIGS. 1A–7

Figure 3A:
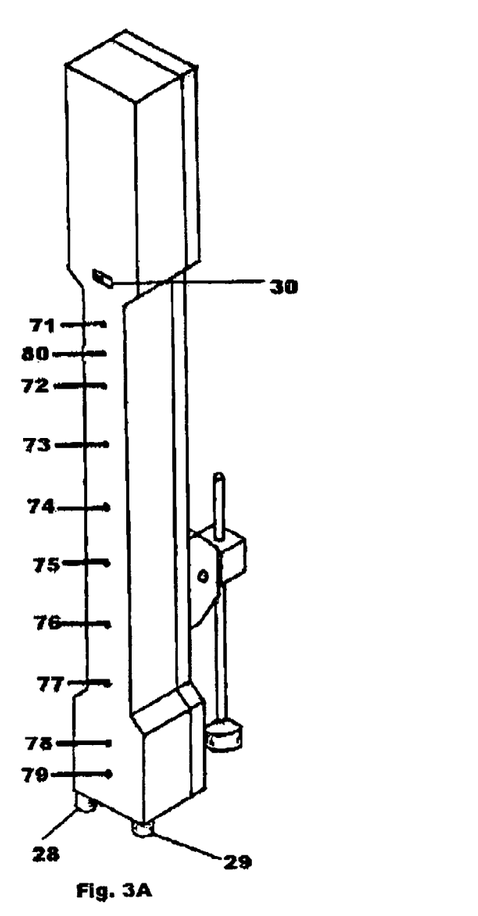
FIGS. 3A, 3B Plan view of Emitter unit showing tripod magnet mount.
Figure 3B:
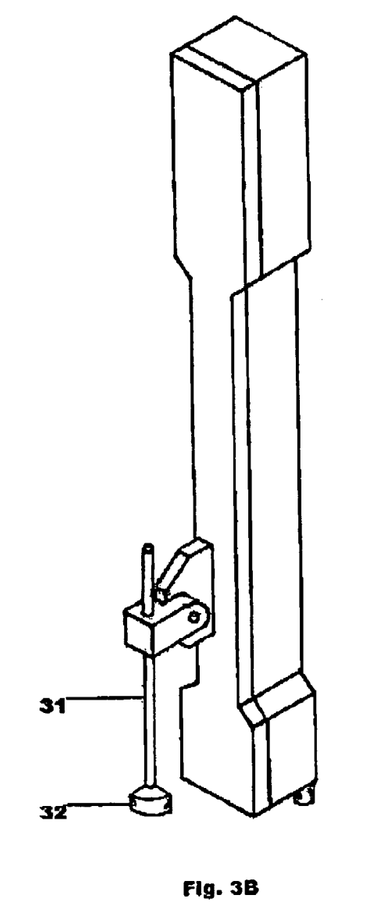
Figure 4A:
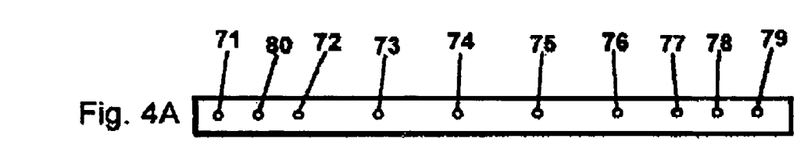
FIG. 4A Front view of Emitter circuit board showing multiple IR LEDs.

The Emitting Unit FIGS. 3A and 3B Consists of:

A case illustrated in FIG. 3A (front view) and FIG. 3B (rear view) containing a circuit board FIG. 4A. A small slide switch 30 (FIG. 3A) is recessed into the case (FIG. 3A). The case (FIG. 3B) is supported by a small rod 31 which is attached to a magnet 32 to provide a universal mounting to trailer hitches (not shown) of various shapes. Two small magnets 28–29 (FIG. 3A) are attached to the bottom of the case to provide lateral stability.

The circuit board (FIG. 4A) contains seven infrared (IR) emitting diodes 71–77 arranged in a vertical line plus two IR diodes 78–79 at the lower end of the board at various angles. There is also a red light emitting diode 80 to indicate power is applied. The IR diodes 71–79 are all pulsed into conduction by a microchip timing circuit. This circuit uses a timer chip 33 (FIG. 5) to generate pulses that gate two PNP transistors 34–35 into conduction. The duty cycle is approximately ten to one. A small red light emitting diode 36 is provided to indicate power is applied to the circuit. There is a zener diode 37 in series with the red light emitting diode 36 so as to extinguish the red light emitting diode 36 if the battery voltage falls below a usable level. A standard nine-volt battery (Not shown) supplies power.

Figures 1A, 1B:
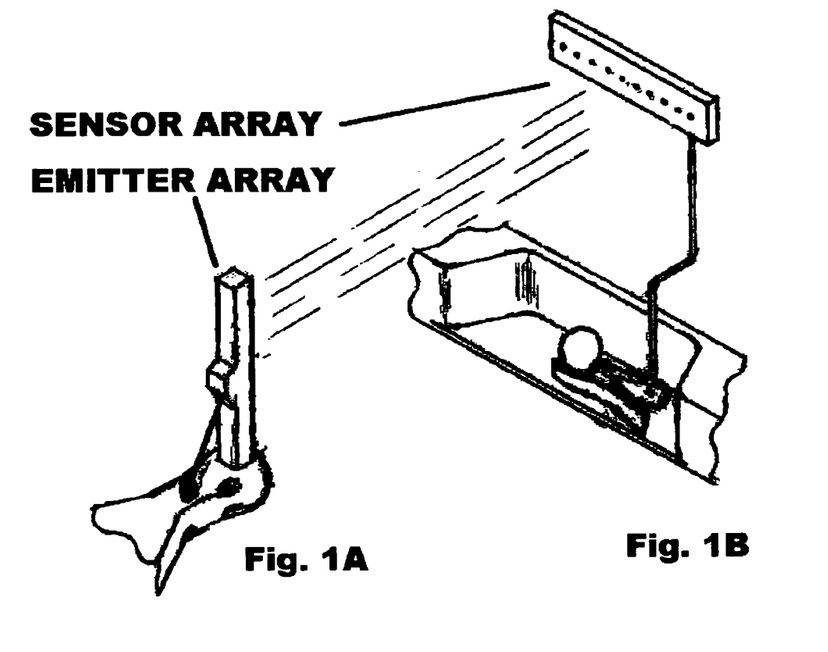
FIG. 1A. Perspective view of the Emitter mounted on a trailer, in accordance with a preferred embodiment of the present invention.
FIG. 1B. Perspective view of the Sensor mounted on a vehicle towing element, in accordance with a preferred embodiment of the present invention.
Figure 1C:
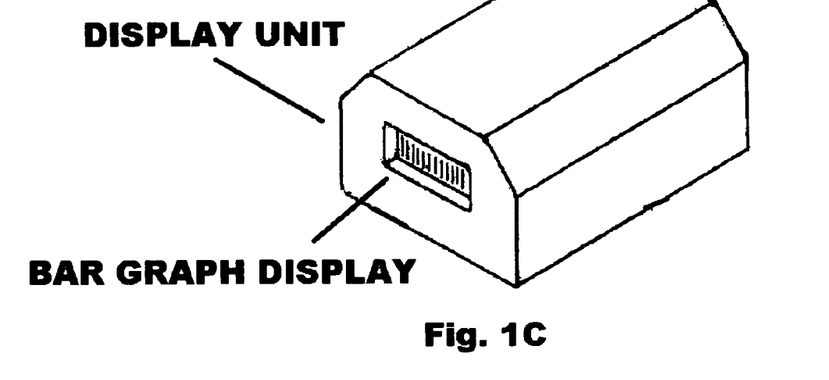
FIG. 1C Plan view of Display unit with multi segmented bar graph
Figure 2A:
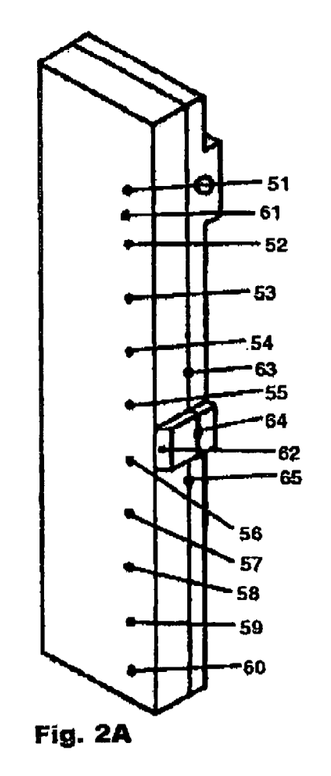
FIGS. 2A, 2B Plan views of Sensor front and back.
Figures 2B, 2C:
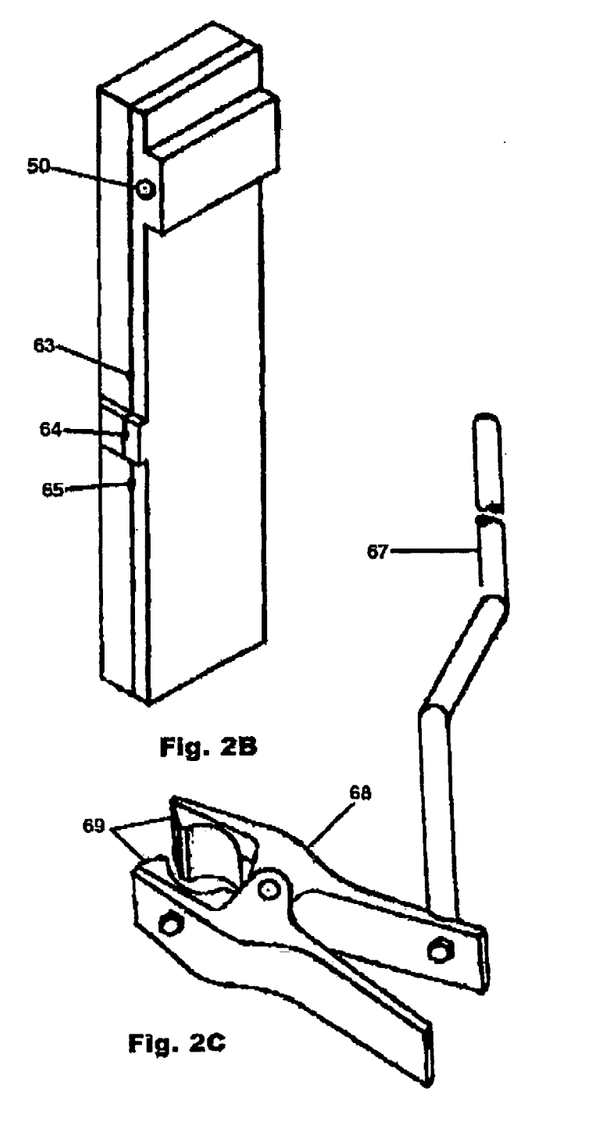
FIG. 2C Plan view of ball clamp with insert and support rod.
Figure 4B:
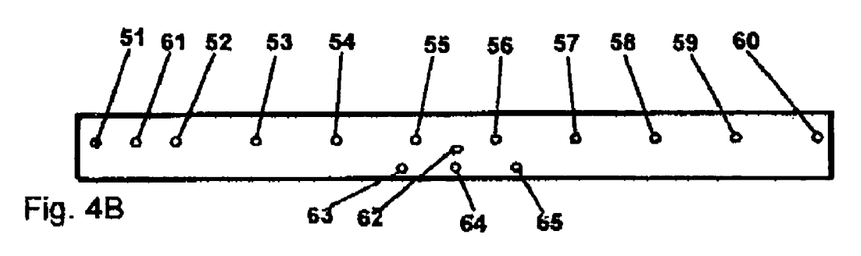
FIG. 4B Front view of Sensor circuit board showing multiple IR sensors.

The Sensing Unit Consists of:

A case illustrated in FIG. 2A (front view) and FIG. 2B (rear view) containing a circuit board FIG. 4B The board contains ten phototransistors 51–60 arranged in a horizontal line. There is an additional phototransistor 62 in the center of the board at an angle. This phototransistor 62 receives infrared light from the angled diodes 78–79 (FIG. 4A) on the emitter board when the two hitching devices are approximately twelve inches apart. Three more phototransistors 63–65 (FIG. 4B) are arranged about the center of the board pointing downward. These phototransistors 63–65 receive infrared light from the angled infrared diodes 78–79 (FIG. 4A) when the two hitching devices are directly aligned. The signals received from the phototransistors 51–60 and 62–65 (FIG. 4B) are fed to 12 identical amplifiers 40 (FIG. 6) only one of which is shown. The output of these devices 40 is peak detected and filtered to remove interference from ambient light. The detected and filtered voltages are applied to the inputs of a microprocessor 43 to be aligned into a serial data stream. This serial data is fed to a 916 MHz. transmitter 44. The output of this transmitter 44 is in frequency shift keyed format. A small antenna 45 radiates the signal. A red light emitting diode 61 (FIG. 4B) indicates power is applied to the circuit. Four standard AAA cells (Not shown) supply power. A vertical rod 67 (FIG. 2C), inserted into hole 50, supports the case. This rod is attached to a spring clamp 68 with an insert 69 to enclose the neck of a towing ball coupler (not shown). This clamp will provide support and center the sensing device FIG. 2A over the ball coupler.

Figure 4C:
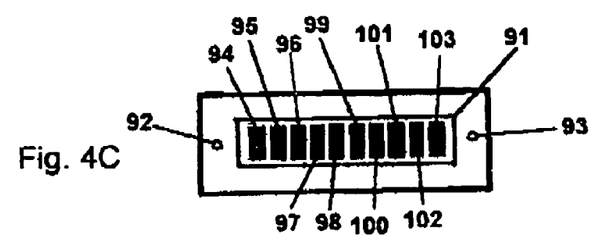
FIG. 4C Front view of Display circuit board showing bar graph, power and stop LEDs.
Figure 5:
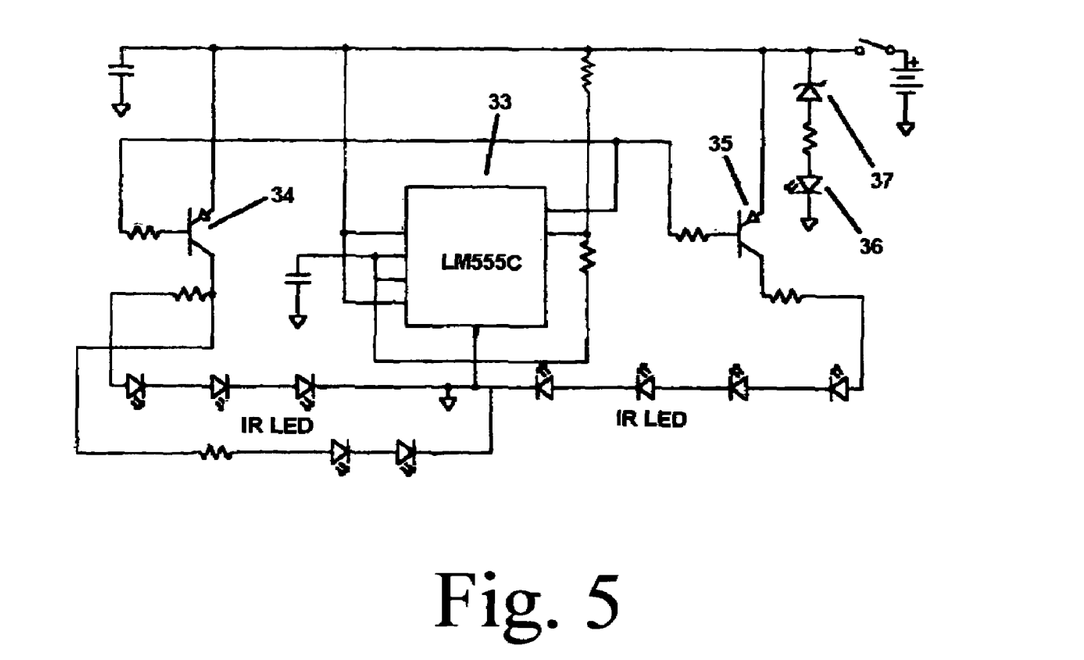
FIG. 5. Schematic diagram of Emitter showing microchip and IR diodes.
Figure 6:
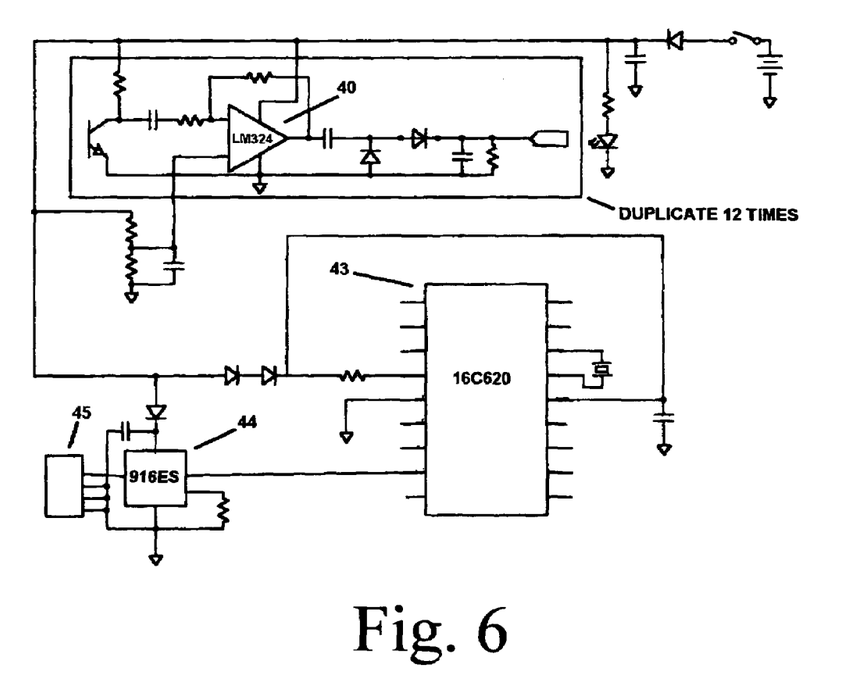
Figure 7:
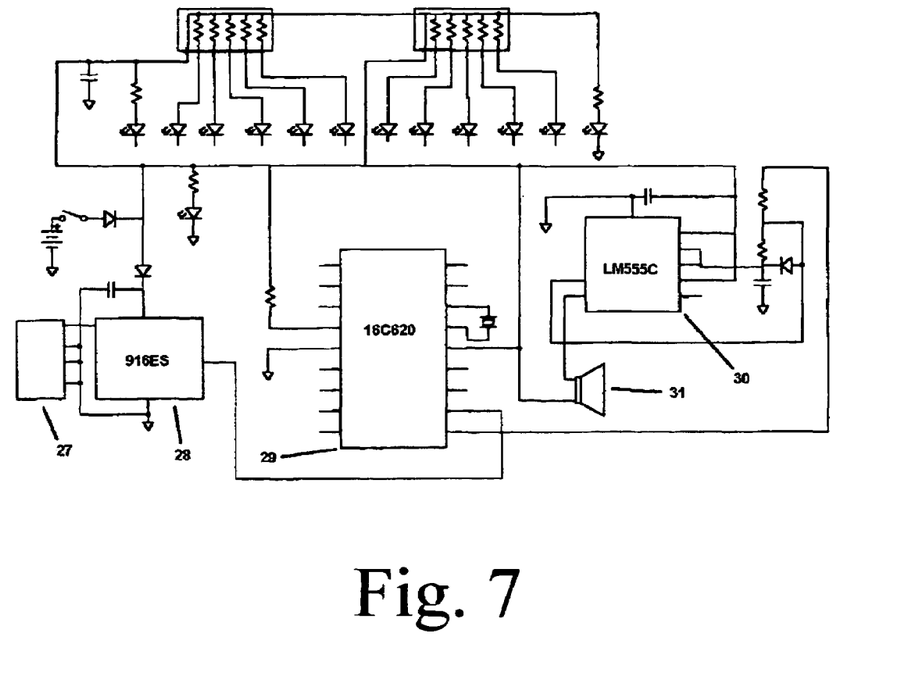

The Display Unit Consists of:

A small portable case FIG. IC (front view) suitable for placing on the dashboard of a vehicle (not shown) or carrying outside to use for initial alignment of emitting and sensing units. The case illustrated in FIG. IC contains a circuit board (FIG. 4C) which contains a small antenna 27 (FIG. 7) feeding a 916 MHz receiver 28. The serial output from the receiver 28 is fed to an input of a microprocessor 29. This microprocessor 29 assembles the data into parallel form and analyzes it to determine if it contains any special information. This data consists of signals indicating which phototransistors 51–60 (FIG. 4B) received infrared light from the emitter unit (FIG. 4A). The data is output to a ten-segment bar graph display 91 (FIG. 4C). The center two segments 98–99 being green, the two on either side of the green 96–97 and 100–101 being yellow and the two on each end 94–95 and 102–103 being red. This coincides with which phototransistors 51–60 (FIG. 4B) received infrared light. If the phototransistor 62 (FIG. 4B) pointed at an angle was activated the display 91 will blink and an audible alarm will intermittently sound to indicate the approach of the two hitching devices. A timer chip 30 (FIG. 7) and a small speaker 31 provide this sound. If any of the three downward pointing phototransistors 63–65 (FIG. 4B) was activated a small red light emitting diode 92 (FIG. 4C) mounted at the left side of the bar graph 91 will illuminate and a continuous tone will be produced. This will indicate the correct alignment of the hitching devices. A small red light emitting diode 93 (FIG. 4C) at the right side of the bar graph 91 indicates power is applied. Four standard AA batteries (Not shown) supply power.

| LOC | OBJECT CODE VALUE | LINE | SOURCE TEXT |
|---|---|---|---|
| | Program source code for sensor microprocessor PIC 16C558 | | |
| | | 00001 | |
| | | 00002 | include reg.asm |
| | 00000001 | 00001 | TIMER EQU 1 |
| | 00000002 | 00002 | PCL EQU 2 |

-continued

| LOC OBJECT CODE VALUE | | LINE | SOURCE TEXT | | |
|---|---|---|---|---|---|
| 00000003 | | 00003 | STATUS | EQU | 3 |
| 00000004 | | 00004 | FSR | EQU | 4 |
| 00000005 | | 00005 | PA | EQU | 5 |
| 00000006 | | 00006 | PB | EQU | 6 |
| 0000000A | | 00007 | PCLATH EQU 0AH | | |
| 0000000B | | 00008 | INTCON EQU 0BH | | |
| 00000081 | | 00009 | OPTI EQU 81H | | |
| 00000085 | | 00010 | TRISA EQU 85H | | |
| 00000086 | | 00011 | TRISB EQU 86H | | |
| 0000008C | | 00012 | PIE1 EQU 8CH | | |
| 0000000C | | 00013 | PIR1 EQU 0CH | | |
| 0000001F | | 00014 | CMCON EQU 1FH | | |
| 00000000 | | 00015 | C | EQU | 0 |
| 00000002 | | 00016 | Z | EQU | 2 |
| 00000001 | | 00017 | F | EQU | 1 |
| 00000000 | | 00018 | W | EQU | 0 |
| | | 00019 | | | |
| | | 00020 | | | |
| | | 00021 | | | |
| | | 00003 | include const58.asm | | |
| 00000020 | | 00001 | WREG | EQU | 20H |
| 00000021 | | 00002 | FLG | EQU | 21H |
| 00000022 | | 00003 | DLY | EQU | 22H |
| 00000023 | | 00004 | DLY1 | EQU | 23H |
| 00000024 | | 00005 | COUNT | EQU | 24H |
| 00000025 | | 00006 | TEMP | EQU | 25H |
| 00000026 | | 00007 | R0 | EQU | 26H |
| 00000027 | | 00008 | R1 | EQU | 27H |
| 00000028 | | 00009 | R2 | EQU | 28H |
| 00000029 | | 00010 | R3 | EQU | 29H |
| 0000002A | | 00011 | R4 | EQU | 2AH |
| 0000002B | | 00012 | R5 | EQU | 2BH |
| 0000002C | | 00013 | R6 | EQU | 2CH |
| 0000002D | | 00014 | R7 | EQU | 2DH |
| 00000032 | | 00015 | BCNT | EQU | 32H |
| 00000033 | | 00016 | DLAY | EQU | 33H |
| 00000034 | | 00017 | COUT | EQU | 34H |
| 00000035 | | 00018 | DFLG | EQU | 35H |
| 00000036 | | 00019 | DCNT | EQU | 36H |
| 0000 | | 00004 | | ORG 0 | |
| 0000 | 2820 | 00005 | | GOTO START | |
| | | 00006 | | | |
| 0020 | | 00007 | | ORG 20 | |
| 0020 | 1683 | 00008 | START | BSF STATUS,5 | |
| 0021 | 3020 | 00009 | | MOVLW 20 | |
| 0022 | 0086 | 00010 | | MOVWF TRISB | |
| 0023 | 3000 | 00011 | | MOVLW 0 | |
| 0024 | 0085 | 00012 | | MOVWF TRISA | |
| 0025 | 3080 | 00013 | | MOVLW 80 | |
| 0026 | 0081 | 00014 | | MOVWF OPTI | |
| 0027 | 1283 | 00015 | | BCF STATUS,5 | |
| 0028 | 008B | 00016 | | MOVWF INTCON | |
| 0029 | 0186 | 00017 | | CLRF PB | |
| 002A | 0185 | 00018 | | CLRF PA | |
| 002B | 3007 | 00019 | | MOVLW 7 | |
| 002C | 009F | 00020 | | MOVWF CMCON | |
| | | 00021 | | | |
| | | 00022 | | | |
| | | 00023 | | | |
| 002D | 1A86 | 00024 | WT | BTFSC PB,5 | |
| 002E | 282D | 00025 | | GOTO WT | |
| 002F | 2064 | 00026 | | CALL CLK1 | |
| 0030 | 1A86 | 00027 | | BTFSC PB,5 | |
| 0031 | 282D | 00028 | | GOTO WT | |
| 0032 | 2061 | 00029 | | CALL CLK | |
| 0033 | 01A6 | 00030 | | CLRF R0 | |
| 0034 | 01A7 | 00031 | | CLRF R1 | |
| 0035 | 1A86 | 00032 | | BTFSC PB,5 | |
| 0036 | 15A6 | 00033 | | BSF R0,3 | |
| 0037 | 2061 | 00034 | | CALL CLK | |
| 0038 | 1A86 | 00035 | | BTFSC PB,5 | |
| 0039 | 1526 | 00036 | | BSF R0,2 | |
| 003A | 2061 | 00037 | | CALL CLK | |
| 003B | 1A86 | 00038 | | BTFSC PB,5 | |
| 003C | 14A6 | 00039 | | BSF R0,1 | |
| 003D | 2061 | 00040 | | CALL CLK | |

-continued

| LOC | OBJECT CODE VALUE | LINE | SOURCE TEXT | |
|---|---|---|---|---|
| 003E | 1A86 | 00041 | | BTFSC PB,5 |
| 003F | 1426 | 00042 | | BSF R0,0 |
| 0040 | 2061 | 00043 | | CALL CLK |
| 0041 | 1A86 | 00044 | | BTFSC PB,5 |
| 0042 | 1527 | 00045 | | BSF R1,2 |
| 0043 | 2061 | 00046 | | CALL CLK |
| 0044 | 1A86 | 00047 | | BTFSC PB,5 |
| 0045 | 15A7 | 00048 | | BSF R1,3 |
| 0046 | 2061 | 00049 | | CALL CLK |
| 0047 | 1A86 | 00050 | | BTFSC PB,5 |
| 0048 | 1627 | 00051 | | BSF R1,4 |
| 0049 | 2061 | 00052 | | CALL CLK |
| 004A | 1A86 | 00053 | | BTFSC PB,5 |
| 004B | 1726 | 00054 | | BSF R0,6 |
| 004C | 2061 | 00055 | | CALL CLK |
| 004D | 1A86 | 00056 | | BTFSC PB,5 |
| 004E | 17A6 | 00057 | | BSF R0,7 |
| 004F | 2061 | 00058 | | CALL CLK |
| 0050 | 1A86 | 00059 | | BTFSC PB,5 |
| 0051 | 14A7 | 00060 | | BSF R1,1 |
| 0052 | 2061 | 00061 | | CALL CLK |
| 0053 | 1A86 | 00062 | | BTFSC PB,5 |
| 0054 | 1427 | 00063 | | BSF R1,0 |
| 0055 | 2061 | 00064 | | CALL CLK |
| 0056 | 1A86 | 00065 | | BTFSC PB,5 |
| 0057 | 1626 | 00066 | | BSF R0,4 |
| 0058 | 0826 | 00067 | | MOVFW R0 |
| 0059 | 3ACF | 00068 | | XORLW 0CF |
| 005A | 0086 | 00069 | | MOVWF PB |
| 005B | 0827 | 00070 | | MOVFW R1 |
| 005C | 3AFF | 00071 | | XORLW 0FF |
| 005D | 0085 | 00072 | | MOVWF PA |
| 005E | 2061 | 00073 | | CALL CLK |
| 005F | 2069 | 00074 | | CALL DY |
| 0060 | 282D | 00075 | | GOTO WT |
| | | 00076 | | |
| | | 00077 | | |
| | | 00078 | | |
| | | 00079 | | |
| 0061 | 2064 | 00080 | CLK | CALL CLK1 |
| 0062 | 2064 | 00081 | | CALL CLK1 |
| 0063 | 0008 | 00082 | | RETURN |
| | | 00083 | | |
| | | 00084 | | |
| 0064 | 302C | 00085 | CLK1 | MOVLW .44 |
| 0065 | 00A4 | 00086 | | MOVWF COUNT |
| 0066 | 0BA4 | 00087 | C2 | DECFSZ COUNT,F |
| 0067 | 2866 | 00088 | | GOTO C2 |
| 0068 | 0008 | 00089 | | RETURN |
| | | 00090 | | |
| 0069 | 307F | 00091 | DY | MOVLW .127 |
| 006A | 00A4 | 00092 | | MOVWF COUNT |
| 006B | 0BA4 | 00093 | C1 | DECFSZ COUNT,F |
| 006C | 286B | 00094 | | GOTO C1 |
| 006D | 0008 | 00095 | | RETURN |
| | | 00096 | | |
| | | 00097 | | |
| | | 00098 | | |
| 2007 | | 00099 | | ORG 2007 |
| 2007 | 3FB1 | 00100 | | DW 3FB1 |
| | | 00101 | | |
| | | 00102 | | END |
| | | | Program source code for emitter microprocessor PIC 16C558 | |
| | | 00001 | include reg.asm | |
| 00000001 | | 00001 | TIMER EQU 1 | |
| 00000002 | | 00002 | PCL EQU 2 | |
| 00000003 | | 00003 | STATUS EQU 3 | |
| 00000004 | | 00004 | FSR EQU 4 | |
| 00000005 | | 00005 | PA EQU 5 | |
| 00000006 | | 00006 | PB EQU 6 | |
| 0000000A | | 00007 | PCLATH EQU 0AH | |
| 0000000B | | 00008 | INTCON EQU 0BH | |
| 00000081 | | 00009 | OPTI EQU 81H | |
| 00000085 | | 00010 | TRISA EQU 85H | |
| 00000086 | | 00011 | TRISB EQU 86H | |

-continued

| LOC OBJECT CODE VALUE | | LINE | SOURCE TEXT | | |
|---|---|---|---|---|---|
| 0000008C | | 00012 | PIE1 | EQU | 8CH |
| 0000000C | | 00013 | PIR1 | EQU | 0CH |
| 0000001F | | 00014 | CMCON | EQU | 1FH |
| 00000000 | | 00015 | C | EQU | 0 |
| 00000002 | | 00016 | Z | EQU | 2 |
| 00000001 | | 00017 | F | EQU | 1 |
| 00000000 | | 00018 | W | EQU | 0 |
| | | 00019 | | | |
| | | 00020 | | | |
| | | 00021 | | | |
| | | 00002 | include const58.asm | | |
| 00000020 | | 00001 | WREG | EQU | 20H |
| 00000021 | | 00002 | FLG | EQU | 21H |
| 00000022 | | 00003 | DLY | EQU | 22H |
| 00000023 | | 00004 | DLY1 | EQU | 23H |
| 00000024 | | 00005 | COUNT | EQU | 24H |
| 00000025 | | 00006 | TEMP | EQU | 25H |
| 00000026 | | 00007 | R0 | EQU | 26H |
| 00000027 | | 00008 | R1 | EQU | 27H |
| 00000028 | | 00009 | R2 | EQU | 28H |
| 00000029 | | 00010 | R3 | EQU | 29H |
| 0000002A | | 00011 | R4 | EQU | 2AH |
| 0000002B | | 00012 | R5 | EQU | 2BH |
| 0000002C | | 00013 | R6 | EQU | 2CH |
| 0000002D | | 00014 | R7 | EQU | 2DH |
| 00000032 | | 00015 | BCNT | EQU | 32H |
| 00000033 | | 00016 | DLAY | EQU | 33H |
| 00000034 | | 00017 | COUT | EQU | 34H |
| 00000035 | | 00018 | DFLG | EQU | 35H |
| 00000036 | | 00019 | DCNT | EQU | 36H |
| 0000 | | 00003 | | ORG 0 | |
| 0000 | 2820 | 00004 | | GOTO START | |
| | | 00005 | | | |
| 0020 | | 00006 | | ORG 20 | |
| 0020 | 1683 | 00007 | START | BSF STATUS,5 | |
| 0021 | 30FB | 00008 | | MOVLW 0FB | |
| 0022 | 0086 | 00009 | | MOVWF TRISB | |
| 0023 | 301F | 00010 | | MOVLW 1F | |
| 0024 | 0085 | 00011 | | MOVWF TRISA | |
| 0025 | 3080 | 00012 | | MOVLW 80 | |
| 0026 | 0081 | 00013 | | MOVWF OPTI | |
| 0027 | 1283 | 00014 | | BCF STATUS,5 | |
| 0028 | 3000 | 00015 | | MOVLW 0 | |
| 0029 | 008B | 00016 | | MOVWF INTCON | |
| 002A | 3007 | 00017 | | MOVLW 7 | |
| 002B | 009F | 00018 | | MOVWF CMCON | |
| 002C | 0185 | 00019 | | CLRF PA | |
| 002D | 0186 | 00020 | | CLRF PB | |
| | | 00021 | | | |
| | | 00022 | | | |
| 002E | 1B86 | 00023 | STRT | BTFSC PB,7 | |
| 002F | 2089 | 00024 | | CALL BLNK | |
| 0030 | 2032 | 00025 | | CALL SYNC | |
| 0031 | 282E | 00026 | | GOTO STRT | |
| | | 00027 | | | |
| 0032 | 0805 | 00028 | SYNC | MOVF PA,W | |
| 0033 | 00A7 | 00029 | | MOVWF R1 | |
| 0034 | 0806 | 00030 | | MOVF PB,W | |
| 0035 | 00A6 | 00031 | | MOVWF R0 | |
| 0036 | 13A6 | 00032 | | BCF R0,7 | |
| | | 00033 | | | |
| 0037 | 1506 | 00034 | GETD | BSF PB,2 | |
| 0038 | 207F | 00035 | | CALL CLK | |
| 0039 | 1106 | 00036 | | BCF PB,2 | |
| 003A | 207F | 00037 | | CALL CLK | |
| 003B | 0103 | 00038 | | CLRW | |
| 003C | 19A7 | 00039 | | BTFSC R1,3 | |
| 003D | 3004 | 00040 | | MOVLW 4 | |
| 003E | 0086 | 00041 | | MOVWF PB | |
| 003F | 207F | 00042 | | CALL CLK | |
| 0040 | 0103 | 00043 | | CLRW | |
| 0041 | 1A27 | 00044 | | BTFSC R1,4 | |
| 0042 | 3004 | 00045 | | MOVLW 4 | |
| 0043 | 0086 | 00046 | | MOVWF PB | |
| 0044 | 207F | 00047 | | CALL CLK | |
| 0045 | 0103 | 00048 | | CLRW | |

-continued

| LOC | OBJECT CODE VALUE | LINE | SOURCE TEXT | |
|---|---|---|---|---|
| 0046 | 1A26 | 00049 | | BTFSC R0,4 |
| 0047 | 3004 | 00050 | | MOVLW 4 |
| 0048 | 0086 | 00051 | | MOVWF PB |
| 0049 | 207F | 00052 | | CALL CLK |
| 004A | 0103 | 00053 | | CLRW |
| 004B | 1927 | 00054 | | BTFSC R1,2 |
| 004C | 3004 | 00055 | | MOVLW 4 |
| 004D | 0086 | 00056 | | MOVWF PB |
| 004E | 207F | 00057 | | CALL CLK |
| 004F | 0103 | 00058 | | CLRW |
| 0050 | 1826 | 00059 | | BTFSC R0,0 |
| 0051 | 3004 | 00060 | | MOVLW 4 |
| 0052 | 0086 | 00061 | | MOVWF PB |
| 0053 | 207F | 00062 | | CALL CLK |
| 0054 | 0103 | 00063 | | CLRW |
| 0055 | 19A6 | 00064 | | BTFSC R0,3 |
| 0056 | 3004 | 00065 | | MOVLW 4 |
| 0057 | 0086 | 00066 | | MOVWF PB |
| 0058 | 207F | 00067 | | CALL CLK |
| 0059 | 0103 | 00068 | | CLRW |
| 005A | 18A7 | 00069 | | BTFSC R1,1 |
| 005B | 3004 | 00070 | | MOVLW 4 |
| 005C | 0086 | 00071 | | MOVWF PB |
| 005D | 207F | 00072 | | CALL CLK |
| 005E | 0103 | 00073 | | CLRW |
| 005F | 1827 | 00074 | | BTFSC R1,0 |
| 0060 | 3004 | 00075 | | MOVLW 4 |
| 0061 | 0086 | 00076 | | MOVWF PB |
| 0062 | 207F | 00077 | | CALL CLK |
| 0063 | 0103 | 00078 | | CLRW |
| 0064 | 1B26 | 00079 | | BTFSC R0,6 |
| 0065 | 3004 | 00080 | | MOVLW 4 |
| 0066 | 0086 | 00081 | | MOVWF PB |
| 0067 | 207F | 00082 | | CALL CLK |
| 0068 | 0103 | 00083 | | CLRW |
| 0069 | 1AA6 | 00084 | | BTFSC R0,5 |
| 006A | 3004 | 00085 | | MOVLW 4 |
| 006B | 0086 | 00086 | | MOVWF PB |
| 006C | 207F | 00087 | | CALL CLK |
| 006D | 0103 | 00088 | | CLRW |
| 006E | 1CA6 | 00089 | | BTFSS R0,1 |
| 006F | 2872 | 00090 | | GOTO NSET |
| 0070 | 17A6 | 00091 | | BSF R0,7 |
| 0071 | 3004 | 00092 | | MOVLW 4 |
| 0072 | 0086 | 00093 | NSET | MOVWF PB |
| 0073 | 207F | 00094 | | CALL CLK |
| 0074 | 0103 | 00095 | | CLRW |
| 0075 | 1BA6 | 00096 | | BTFSC R0,7 |
| 0076 | 3004 | 00097 | | MOVLW 4 |
| 0077 | 0086 | 00098 | | MOVWF PB |
| 0078 | 207F | 00099 | | CALL CLK |
| 0079 | 1506 | 00100 | | BSF PB,2 |
| 007A | 2084 | 00101 | | CALL DY |
| 007B | 2084 | 00102 | | CALL DY |
| 007C | 2084 | 00103 | | CALL DY |
| 007D | 2084 | 00104 | | CALL DY |
| 007E | 0008 | 00105 | | RETURN |
| | | 00106 | | |
| | | 00107 | | |
| | | 00108 | | |
| 007F | 305C | 00109 | CLK | MOVLW .92 |
| 0080 | 00A4 | 00110 | | MOVWF COUNT |
| 0081 | 0BA4 | 00111 | C2 | DECFSZ COUNT,F |
| 0082 | 2881 | 00112 | | GOTO C2 |
| 0083 | 0008 | 00113 | | RETURN |
| | | 00114 | | |
| | | 00115 | | |
| 0084 | 30FA | 00116 | DY | MOVLW .250 |
| 0085 | 00A4 | 00117 | | MOVWF COUNT |
| 0086 | 0BA4 | 00118 | C1 | DECFSZ COUNT,F |
| 0087 | 2886 | 00119 | | GOTO C1 |
| 0088 | 0008 | 00120 | | RETURN |
| | | 00121 | | |
| 0089 | 18A6 | 00122 | BLNK | BTFSC R0,1 |
| 008A | 0008 | 00123 | | RETURN |
| 008B | 208E | 00124 | | CALL OFF |

-continued

| LOC | OBJECT CODE VALUE | LINE | | SOURCE TEXT | |
|---|---|---|---|---|---|
| 008C | 2096 | 00125 | | CALL ON | |
| 008D | 0008 | 00126 | | RETURN | |
| | | 00127 | | | |
| 008E | 172D | 00128 | OFF | BSF R7,6 | |
| 008F | 01A6 | 00129 | LP1 | CLRF R0 | |
| 0090 | 01A7 | 00130 | | CLRF R1 | |
| 0091 | 17A6 | 00131 | | BSF R0,7 | |
| 0092 | 2037 | 00132 | | CALL GETD | |
| 0093 | 0BAD | 00133 | | DECFSZ R7,F | |
| 0094 | 288F | 00134 | | GOTO LP1 | |
| 0095 | 0008 | 00135 | | RETURN | |
| | | 00136 | | | |
| 0096 | 172D | 00137 | ON | BSF R7,6 | |
| 0097 | 2032 | 00138 | LP | CALL SYNC | |
| 0098 | 0BAD | 00139 | | DECFSZ R7,F | |
| 0099 | 2897 | 00140 | | GOTO LP | |
| 009A | 0008 | 00141 | | RETURN | |
| | | 00142 | | | |
| | | 00143 | | | |
| | | 00144 | | | |
| | | 00145 | | | |
| | | 00146 | | | |
| 009B | 01AD | 00147 | OFF3 | CLRF R7 | ;DELAY 65536 .219SEC |
| 009C | 01A9 | 00148 | | CLRF R3 | ;OFF TIME |
| 009D | 0BA9 | 00149 | LP2 | DECFSZ R3,F | |
| 009E | 289D | 00150 | | GOTO LP2 | |
| 009F | 0BAD | 00151 | | DECFSZ R7,F | |
| 00A0 | 289D | 00152 | | GOTO LP2 | |
| 00A1 | 01AD | 00153 | | CLRF R7 | ;DELAY 65536 .219SEC |
| 00A2 | 01A9 | 00154 | | CLRF R3 | ;OFF TIME |
| 00A3 | 0BA9 | 00155 | LP3 | DECFSZ R3,F | |
| 00A4 | 28A3 | 00156 | | GOTO LP3 | |
| 00A5 | 0BAD | 00157 | | DECFSZ R7,F | |
| 00A6 | 28A3 | 00158 | | GOTO LP3 | |
| 00A7 | 0008 | 00159 | | RETURN | |
| | | 00160 | | | |
| | | 00161 | | | |
| 2007 | | 00162 | | ORG 2007 | |
| 2007 | 3FB1 | 00163 | | DW 3FB1 | |
| | | 00164 | | END | |

We claim:

1. An apparatus for directing a driver of a towing vehicle having a towing coupling element toward a towed vehicle having a towed coupling element for hitching said couplings of said vehicles together, comprising:
   (a) first emitting means mounted on said towed vehicle transmitting a beam of infrared light toward said towing vehicle;
   (b) first receiver means mounted on said towing vehicle and comprising a plurality of phototransistors in predetermined relation to said towing coupling element for detecting the presence of said first beam;
   (c) first indicator means coupled to said first receiver means by radio frequency for indicating the position and distance of said towed coupling element in relation to said towing coupling element, said indicator means being wireless, portable and operable at locations out of line of sight of said first receiver means;
   (d) first spring operated retaining device, encircling a vehicles towing coupling element, wherein semi-circular inserts are attached within said retaining device to enable automatic centering of said receiving means placing said receiving means horizontal and centered above said towing coupling element,
   (e) first tripod form magnetic fixture being attached to said emitting means enabling said emitting means to be removeably attached to various shapes of towed vehicles coupling element.

2. The apparatus of claim 1 wherein said emitting means includes a plurality of infrared emitting devices placed at predetermined angles and said infrared emitters are pulsed at a predetermined rate by a microchip timing device.

3. The apparatus in claim 1 wherein said receiving means is removably attached to said towing vehicles coupling element in a horizontal plane.

4. The apparatus of claim 1 wherein said receiving means has a plurality of phototransistors spaced apart at a distance lesser than the width of said towing coupling element.

5. The apparatus of claim 1 wherein said receiving means has an additional phototransistor directed at an angle providing a means to detect the approach of said emitting means and give an alarm at approximatly 12 inches seperation.

6. The apparatus of claim 1 wherein said receiving means has additional phototransistors directed downward providing a means to detect the proper positioning of said towing and said towed coupling elements for hitching.

7. The apparatus of claim 1 wherein said receiving means contains a means to filter and process signals from said phototransistors and deliver said signals to said indicating means.

8. The apparatus of claim 1 wherein said indicating means is wireless, portable and self contained.

9. The apparatus of claim 1 wherein said indicating means includes a plurality of light emitting diodes of various colors for indicating the relative lateral position and seperation of said vehicles coupling elements.

10. The apparatus of claim 1 wherein said indicating means provides an indication of the approach within 12 inches of said towing coupling element to said towed coupling element by means of audible and visual means.

11. The apparatus of claim 1 wherein said indicating means provides an indication of the proper position for hitching of said towing coupling element to said towed coupling element by audible and visual means.

* * * * *